United States Patent
Towal

(10) Patent No.: US 10,479,375 B2
(45) Date of Patent: Nov. 19, 2019

(54) AUTONOMOUSLY PERFORMING DEFAULT OPERATIONS BASED ON CURRENT OPERATING CONTEXTS

(71) Applicant: QUALCOMM Incorporated, San Diego, CA (US)

(72) Inventor: Regan Towal, La Jolla, CA (US)

(73) Assignee: QUALCOMM Incorporated, San Diego, CA (US)

(*) Notice: Subject to any disclaimer, the term of this patent is extended or adjusted under 35 U.S.C. 154(b) by 217 days.

(21) Appl. No.: 15/434,987

(22) Filed: Feb. 16, 2017

(65) Prior Publication Data
US 2018/0229737 A1 Aug. 16, 2018

(51) Int. Cl.
*B60W 10/18* (2012.01)
*B60W 10/20* (2006.01)
(Continued)

(52) U.S. Cl.
CPC ............ *B60W 50/02* (2013.01); *B60W 10/18* (2013.01); *B60W 10/20* (2013.01); *B60W 30/165* (2013.01); *B60W 50/082* (2013.01); *B60W 50/087* (2013.01); *B60W 50/14* (2013.01); *G05D 1/0055* (2013.01);
(Continued)

(58) Field of Classification Search
CPC .... B60W 10/18; B60W 10/20; B60W 30/165; B60W 50/02; B60W 50/082; B60W 50/087; B60W 50/14; B60W 2050/146; B60W 2400/00; B60W 2420/42; B60W 2540/22; B60W 2540/24; B60W 2540/26; B60W 2550/20; G05D 1/0055; G05D 1/0088; G05D 1/0214; G05D 2201/0213
See application file for complete search history.

(56) References Cited

U.S. PATENT DOCUMENTS 8,874,301 B1 * 10/2014 Rao ...................... B60K 28/066
180/272
8,874,360 B2 * 10/2014 Klinger .................. G08G 1/162
701/22

(Continued)

FOREIGN PATENT DOCUMENTS

SE 538079 C2 3/2016

OTHER PUBLICATIONS

International Search Report and Written Opinion—PCT/US2018/014654—ISA/EPO—dated May 16, 2018.
(Continued)

*Primary Examiner* — Jerrah Edwards
(74) *Attorney, Agent, or Firm* — Qualcomm Incorporated

(57) ABSTRACT

In general, techniques are described for autonomously performing default operations. A vehicle comprising a processor and a memory may be configured to perform the techniques. The processor may determine, while currently operating autonomously, a current context in which the vehicle is operating autonomously. The memory may store the current context. The processor may further determine, while currently operating autonomously and based on the current context, one of a plurality of operations to perform when the vehicle is unable to continue to operate autonomously, and unable to transfer control of the vehicle to an occupant, and perform the determined one of the plurality of operations.

24 Claims, 6 Drawing Sheets

(51) Int. Cl.
  B60W 30/165 (2012.01)
  B60W 50/02 (2012.01)
  B60W 50/08 (2012.01)
  B60W 50/14 (2012.01)
  G05D 1/00 (2006.01)
  G05D 1/02 (2006.01)

(52) U.S. Cl.
  CPC ..... *G05D 1/0088* (2013.01); *B60W 2050/146* (2013.01); *B60W 2400/00* (2013.01); *B60W 2420/42* (2013.01); *B60W 2540/22* (2013.01); *B60W 2540/24* (2013.01); *B60W 2540/26* (2013.01); *B60W 2550/20* (2013.01); *G05D 1/0214* (2013.01); *G05D 2201/0213* (2013.01)

(56) References Cited

U.S. PATENT DOCUMENTS

| | | |
|---|---|---|
| 9,195,232 B1 | 11/2015 | Egnor et al. |
| 2011/0241862 A1 | 10/2011 | Debouk et al. |
| 2014/0081505 A1* | 3/2014 | Klinger ............... G08G 1/162 701/25 |
| 2014/0244096 A1 | 8/2014 | An et al. |
| 2015/0321641 A1 | 11/2015 | Abou Mahmoud et al. |
| 2016/0026180 A1 | 1/2016 | Tsimhoni et al. |
| 2016/0202700 A1 | 7/2016 | Sprigg |

OTHER PUBLICATIONS

Krafka, et al., "Eye Tracking for Everyone," In 29th IEEE Conference on Computer Vision and Pattern Recognition, Jun. 26-Jul. 1, 2016, pp. 2176-2184.

Kim, et al., "Vision-Based Eye-Gaze Tracking for Human Computer Interface," in Proceedings of IEEE International Conference on Systems, Man and Cybernetics, vol. 2, Oct. 12-15, 1999, pp. 324-329.

Haloi et al., "Characterizing Driving Behavior Using Automatic Visual Analysis," in IBM I-CARE '14, Oct. 9-11, 2014, Bangalore, India, 4 pgs.

Willke et al., "A Survey of Inter-Vehicle Communication Protocols and Their Applications," in IEEE Communications Surveys & Tutorials Journal, vol. 11, No. 2, Second Quarter, Jun. 2, 2009, pp. 3-20.

Kumari, "Detection of Drowsy Driver's through Eye State Analysis," in International Journal of Science and Research (IJSR), vol. 3, No. 9, Sep. 9, 2014, pp. 1027-1031.

Du et al., "Driver Fatigue Detection based on Eye State Analysis," in Proceedings of the 11th Joint Conference on Information Sciences, Shenzhen, China, Dec. 15-20, 2008, 6 pgs.

Tanner et al., "Coordination of Multiple Autonomous Vehicles," Department of Electrical and Systems Engineering, Jun. 17, 2009, 6 pgs.

* cited by examiner

AUTONOMOUSLY PERFORMING DEFAULT OPERATIONS BASED ON CURRENT OPERATING CONTEXTS

TECHNICAL FIELD

This disclosure relates to autonomous vehicles.

BACKGROUND

Vehicles are increasingly becoming more autonomous. That is, vehicles are beginning to perform tasks that an occupant would normally perform without any occupant interaction. Levels of autonomy for vehicles have been defined with level zero generally indicating no automation up to level four or five, which may refer to a fully autonomous vehicle where an individual need only specify a destination to which the fully autonomous vehicle is to drive.

Currently, most production vehicles fall between levels zero and five. Mid-level (e.g., levels two through three) autonomous vehicles may perform some tasks normally performed by an occupant when operating the vehicle using adaptive cruise control, providing lane monitoring, and performing automated crash avoidance (usually by applying the breaks), etc.

In mid-level autonomous vehicles and even in fully autonomous (e.g., level four or five) vehicles, when problems arise for which the vehicle is not equipped to handle, the autonomous vehicle may perform a single default action by which to transition control of the vehicle back to the occupant. The occupant may then operate the vehicle until the problem has been overcome.

SUMMARY

In general, the disclosure describes techniques for performing default actions that vary based on the operational context of the autonomous vehicle. Rather than perform one or possibly two default actions, such as defaulting to transitioning control of the vehicle back to an occupant or come to a full stop in the middle of the street when the occupant is unavailable to control the autonomous vehicle, regardless of a surrounding driving context, the techniques may enable the autonomous vehicle to identify the context in which the autonomous vehicle is operating, and perform a progression of default actions suited for the identified context.

In one example, the disclosure describes a method of autonomous operation of a vehicle, the method comprising determining, by the vehicle currently operating autonomously, a current context in which the vehicle is operating autonomously. The method also comprising determining, by the vehicle currently operating autonomously and based on the current context, one of a plurality of operations to perform when the vehicle is unable to continue to operate autonomously, and unable to transfer control of the vehicle to an occupant, and performing, by the vehicle, the determined one of the plurality of operations.

In one example, the disclosure describes a vehicle configured to operate autonomously, the vehicle comprising a processor configured to determine, while currently operating autonomously, a current context in which the vehicle is operating autonomously, and a memory configured to store the current context. The processor is further configured to determine, while currently operating autonomously and based on the current context, one of a plurality of operations to perform when the vehicle is unable to continue to operate autonomously, and unable to transfer control of the vehicle to an occupant, and perform the determined one of the plurality of operations.

In one example, the disclosure describes a vehicle configured to operate autonomously, the vehicle comprising means for determining, while the vehicle is currently operating autonomously, a current context in which the vehicle is operating autonomously. The vehicle also comprising means for determining, while the vehicle is currently operating autonomously and based on the current context, one of a plurality of operations to perform when the vehicle is unable to continue to operate autonomously, and unable to transfer control of the vehicle to an occupant, and means for performing the determined one of the plurality of operations.

In one example, the disclosure describes a non-transitory computer-readable storage medium having stored thereon instructions that, when executed, cause one or more processors of a vehicle to determine, while the vehicle is currently operating autonomously, a current context in which the vehicle is operating autonomously, determine, while the vehicle is currently operating autonomously and based on the current context, one of a plurality of operations to perform when the vehicle is unable to continue to operate autonomously, and unable to transfer control of the vehicle to an occupant, and perform the determined one of the plurality of operations.

The details of one or more examples are set forth in the accompanying drawings and the description below. Other features, objects, and advantages will be apparent from the description, drawings, and claims.

DETAILED DESCRIPTION

Figure 1:
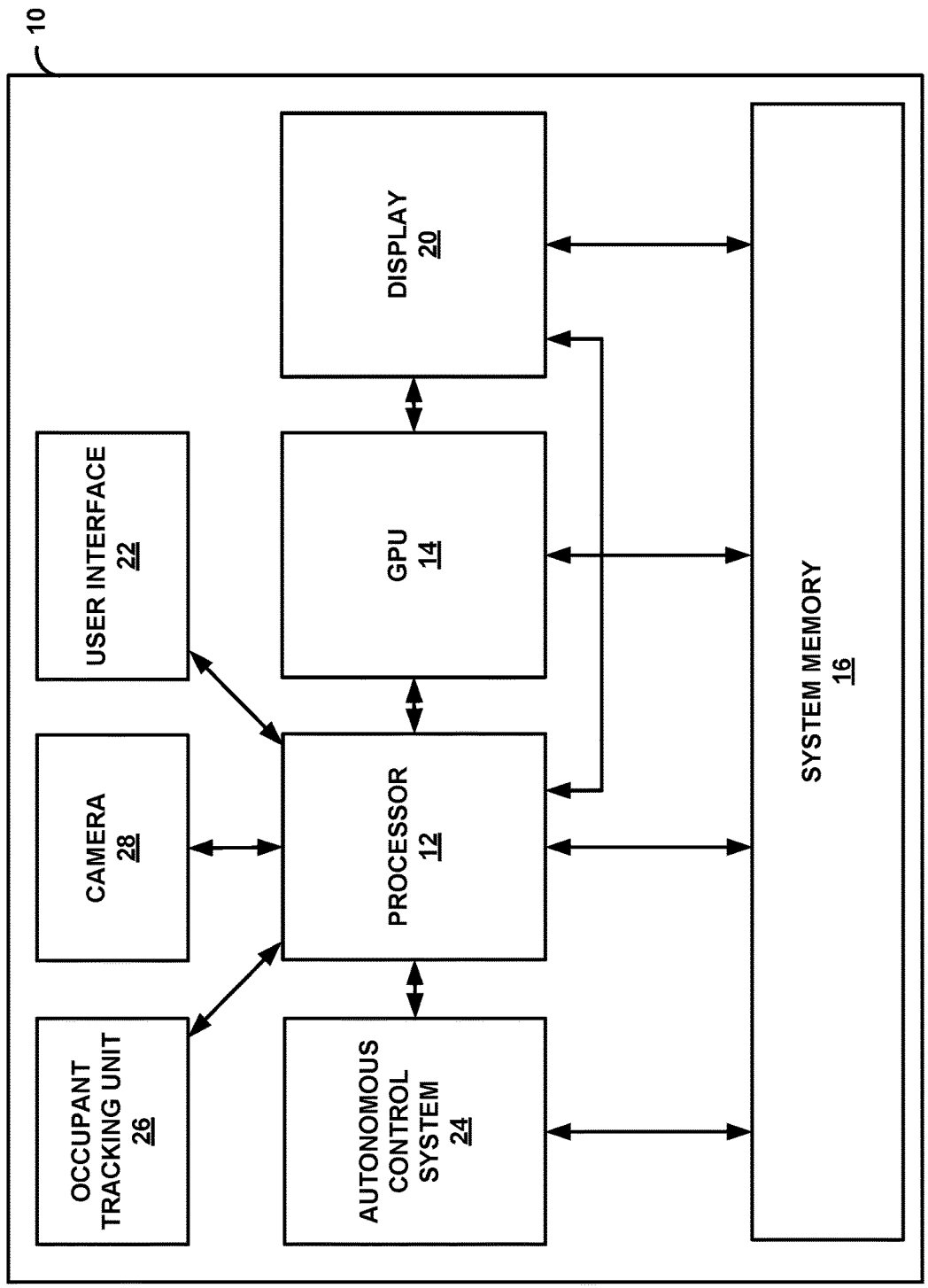
FIG. 1 is a block diagram illustrating an example autonomous vehicle configured to perform various aspects of the autonomous driving techniques described in this disclosure.

As vehicles transition from mid-level autonomous vehicles to fully autonomous vehicles, occupants may be responsible for performing fewer and fewer tasks to maintain control of the autonomous vehicles. Occupants, in fully autonomous vehicles, may transition from being actual operators of the vehicle to being primarily passengers except for instances where the autonomous vehicle may transition control of the vehicle back to the occupant.

In this context, occupants acting as passengers may enter states in which the autonomous vehicle cannot transfer control back to the occupant. For example, an occupant may fall asleep while acting as a passenger, and the autonomous vehicle may be unable to wake the occupant so as to return control of the autonomous vehicle back to the occupant. In other examples, none of the passengers may be licensed to operate a vehicle (e.g., where the passengers are a group of children under the licensed driving age).

Techniques of this description provide a framework for performing default operations when the autonomous vehicle is unable to transfer control back to the occupant. Rather than have a static default operation (e.g., pull over to the side of the rode and come to a stop, or simply come to a stop) that the autonomous vehicle may perform in all contexts when the occupant is unavailable to take over control of the vehicle, the techniques may provide for various default operations that differ depending on the current context in which the autonomous vehicle is operating.

The vehicle may determine the context in which the vehicle is currently operating based on a number of different contextual factors. One contextual factor may include a current condition in which the vehicle is autonomously operating the vehicle, such as current weather conditions (e.g., fog, sunny, rainy, windy, etc.), an operating mode of the vehicle (e.g., moving or stationary), a location of the vehicle (e.g., blocking traffic, in a location at which the autonomous vehicle is able to park), and the like.

Another contextual factor may include a confidence that the autonomous vehicle has determined for the current conditions. For the confidence evaluation, the autonomous vehicle may take into a state of sensors used to detect the current conditions. That is, some sensors may be failing or faulty, which trigger the inability to detect certain aspects of the current condition (such as weather sensors failing).

Another contextual factor may include a state of the occupant. The autonomous vehicle may employ sensors to perform eye tracking to evaluate occupant fatigue, sensors to detect use of alcohol by the occupant, sensors to detect a sleep state of the occupant, sensors to detect the height or weight of the occupant, etc.

Another contextual factor may include a state of other vehicles driving alongside the autonomous vehicle. For example, the autonomous vehicle may evaluate current traffic conditions (e.g., extent of congestion, accidents, etc.), other vehicle behavior (e.g., extensive swerving by other vehicles, other vehicles exceeding the posted speed limit, etc.), destination of other vehicles, safety of the other vehicles, and the like.

In some instances, the other vehicles may communicate with the autonomous vehicle to communicate various ones of the foregoing contextual factors. That is, a vehicle driving on the same road but ahead of the autonomous vehicle may report accidents or traffic conditions, weather or other events, vehicle behavior, etc.

The autonomous vehicle may assess a number of decisions that depend on occupant and vehicle contextual factors to identify one of the default operations to perform when transfer of control from the vehicle to an occupant is not available. The autonomous vehicle may next perform the selected one of the default operations.

In this respect, rather than perform one or possibly two default actions, such as defaulting to transitioning control of the vehicle back to an occupant or come to a full stop in the middle of the street when the occupant is unavailable to control the autonomous vehicle, regardless of a surrounding driving context, the techniques may enable the autonomous vehicle to identify the context (e.g., using one or more of the contextual factors discussed above) in which the autonomous vehicle is operating, and perform a progression of default actions suited for the identified context.

FIG. 1 is a block diagram illustrating an example autonomous vehicle 10 configured to perform various aspects of the autonomous driving techniques described in this disclosure. In the example of FIG. 1, autonomous vehicle 10 may represent a vehicle configured to automate one or more task associated with operation of vehicle 10, including automating most if not all of the tasks associated with operation of vehicle 10 such that an occupant need not, under most conditions, maintain awareness of a context in which vehicle 10 is operating.

Autonomous vehicle 10 is assumed in the description below to be an automobile. However, the techniques described in this disclosure may apply to any type of vehicle capable of conveying one or more occupants and being autonomously operated, such as a motorcycle, a bus, a recreational vehicle (RV), a semi-trailer truck, a tractor or other type of farm equipment, a train, a plane, a personal transport vehicle, and the like.

In the example of FIG. 1, autonomous vehicle 10 includes a processor 12, a graphics processing unit (GPU) 14, and system memory 16. In some examples, processor 12, GPU 14, and transceiver module 22 may be formed as an integrated circuit (IC). For example, the IC may be considered as a processing chip within a chip package, and may be a system-on-chip (SoC).

Examples of processor 12, and GPU 14 include, but are not limited to, one or more digital signal processors (DSPs), general purpose microprocessors, application specific integrated circuits (ASICs), field programmable logic arrays (FPGAs), or other equivalent integrated or discrete logic circuitry. Processor 12 may be the central processing unit (CPU) of autonomous vehicle 10. In some examples, GPU 14 may be specialized hardware that includes integrated and/or discrete logic circuitry that provides GPU 14 with massive parallel processing capabilities suitable for graphics processing. In some instances, GPU 14 may also include general purpose processing capabilities, and may be referred to as a general purpose GPU (GPGPU) when implementing general purpose processing tasks (i.e., non-graphics related tasks).

Processor 12 may execute various types of applications. Examples of the applications include web browsers, e-mail applications, spreadsheets, video games, or other applications that generate viewable objects for display. System memory 16 may store instructions for execution of the one or more applications. The execution of an application on processor 12 causes processor 12 to produce graphics data for image content that is to be displayed. Processor 12 may transmit graphics data of the image content to GPU 14 for further processing based on instructions or commands that processor 12 transmits to GPU 14.

Processor 12 may communicate with GPU 14 in accordance with an application programming interface (API). Examples of such APIs include the DirectX® API by Microsoft®, the OpenGL® or OpenGL ES® by the Khronos group, and the OpenCL™; however, aspects of this disclosure are not limited to the DirectX, the OpenGL, or the OpenCL APIs, and may be extended to other types of APIs. Moreover, the techniques described in this disclosure are not required to function in accordance with an API, and processor 12 and GPU 14 may utilize any technique for communicating with GPU 14.

System memory 16 may represent a memory for device 10. System memory 16 may comprise one or more computer-readable storage media. Examples of system memory 16 include, but are not limited to, a random access memory (RAM), an electrically erasable programmable read-only memory (EEPROM), flash memory, or other medium that can be used to carry or store desired program code in the form of instructions and/or data structures and that can be accessed by a computer or a processor.

In some aspects, system memory 16 may include instructions that cause processor 12 to perform the functions ascribed in this disclosure to processor 12. Accordingly, system memory 16 may be a computer-readable storage medium having instructions stored thereon that, when executed, cause one or more processors (e.g., processor 12) to perform various functions.

System memory 16 is a non-transitory storage medium. The term "non-transitory" indicates that the storage medium is not embodied in a carrier wave or a propagated signal. However, the term "non-transitory" should not be interpreted to mean that system memory 16 is non-movable or that its contents are static. As one example, system memory 16 may be removed from autonomous vehicle 10, and moved to another device. As another example, memory, substantially similar to system memory 16, may be inserted into autonomous vehicle 10. In certain examples, a non-transitory storage medium may store data that can, over time, change (e.g., in RAM).

As further shown in the example of FIG. 1, autonomous vehicle 10 may include a display 20 and a user interface 22. Display 20 may represent any type of passive reflective screen on which images can be projected, or an active reflective or emissive or transmissive display capable of displaying images (such as a light emitting diode (LED) display, an organic LED (OLED) display, liquid crystal display (LCD), or any other type of active display). Although shown as including a single display 20, autonomous vehicle 10 may include a number of displays that may be positioned throughout the cabin of autonomous vehicle 10. In some examples, passive versions of display 20 or certain types of active versions of display 20 (e.g., OLED displays) may be integrated into seats, tables, roof liners, flooring, windows (or in vehicles with no windows or few windows, walls) or other aspects of the cabin of autonomous vehicles. When display 20 represents a passive display, display 20 may also include a projector or other image projection device capable of projecting or otherwise recreating an image on passive display 20.

Display 20 may also represent displays in wired or wireless communication with autonomous vehicle 10. Display 20 may, for example, represent a computing device, such as a laptop computer, a heads-up display, a head-mounted display, an augmented reality computing device or display (such as "smart glasses"), a virtual reality computing device or display, a mobile phone (including a so-called "smart phone"), a tablet computer, a gaming system, or another type of computing device capable of acting as an extension of or in place of a display integrated into autonomous vehicle 10.

User interface 22 may represent any type of physical or virtual interface with which a user may interface to control various functionalities of autonomous vehicle 10. User interface 22 may include physical buttons, knobs, sliders or other physical control implements. User interface 22 may also include a virtual interface whereby an occupant of autonomous vehicle 10 interacts with virtual buttons, knobs, sliders or other virtual interface elements via, as one example, a touch-sensitive screen, or via a touchless interface. The occupant may interface with user interface 22 to control one or more of a climate within autonomous vehicle 10, audio playback by autonomous vehicle 10, video playback by autonomous vehicle 10, transmissions (such as cellphone calls) through autonomous vehicle 10, or any other operation capable of being performed by autonomous vehicle 10.

User interface 22 may also represent interfaces extended to display 20 when acting as an extension of or in place of a display integrated into autonomous vehicle 10. That is, user interface 22 may include virtual interfaces presented via the above noted HUD, augmented reality computing device, virtual reality computing device or display, tablet computer, or any other of the different types of extended displays listed above.

In the context of autonomous vehicle 10, user interface 22 may further represent physical elements used for manually or semi-manually controlling autonomous vehicle 10. For example, user interface 22 may include one or more steering wheels for controlling a direction of travel of autonomous vehicle 10, one or more pedals for controlling a rate of travel of autonomous vehicle 10, one or more hand brakes, etc.

Autonomous vehicle 10 may further include an autonomous control system 24, which represents a system configured to autonomously operate one or more aspects of vehicle 10 without requiring intervention by an occupant of autonomous vehicle 10. Autonomous control system 24 may include various sensors and units, such as a global positioning system (GPS) unit, one or more accelerometer units, one or more gyroscope units, one or more compass units, one or more radar units, one or more LiDaR (which refers to a Light Detection and Ranging) units, one or more cameras, one or more sensors for measuring various aspects of vehicle 10 (such as a steering wheel torque sensor, steering wheel grip sensor, one or more pedal sensors, tire sensors, tire pressure sensors), and any other type of sensor or unit that may assist in autonomous operation of vehicle 10.

In this respect, autonomous control system 24 may control operation of vehicle 10 allowing the occupant to participate in tasks unrelated to the operation of vehicle 10. As such, occupants, in fully autonomous vehicles, may transition from being actual operators of the vehicle to being passengers except for instances where the autonomous vehicle may transition control of the vehicle back to the occupant.

In this context, occupants acting as passengers may enter states in which the autonomous vehicle cannot transfer control back to the occupant. For example, an occupant may fall asleep while acting as a passenger, and the autonomous vehicle may be unable to wake the occupant so as to return control of the autonomous vehicle back to the occupant. In other examples, none of the passengers may be licensed to operate a vehicle (e.g., where the passengers are a group of children under the licensed driving age).

In accordance with various aspects of the techniques described in this disclosure, autonomous vehicle 10 may adhere to a framework for performing default operations when autonomous vehicle 10 is unable to transfer control back to the occupant. Rather than have a static default operation (e.g., pull over to the side of the rode and come to a stop, or simply come to a stop) that autonomous vehicle 10 may perform in all contexts when the occupant is unavailable to take over control of the vehicle, the techniques may provide for various default operations that differ depending on the current context in which autonomous vehicle 10 is operating.

Autonomous vehicle 10 may determine the context in which vehicle 10 is currently operating based on a number of different contextual factors. One contextual factor may include a current condition in which vehicle 10 is autonomously operating, such as current weather conditions (e.g., fog, sunny, rainy, windy, etc.), an operating mode of the vehicle (e.g., moving or stationary), a location of the vehicle (e.g., blocking traffic, in a location at which the autonomous vehicle is able to park), and the like.

Another contextual factor may include a confidence of the current context in which autonomous vehicle 10 is operating. For the confidence evaluation, autonomous vehicle 10 may take into a state of sensors used to detect the current conditions. That is, some sensors may be failing or faulty, which triggered the inability to detect certain aspects of the current condition (such as weather sensors failing).

Another contextual factor may include a state of the occupant. Occupant tracking unit 26 may represent one or more sensors and other logic (including processors, GPUs, etc.) to perform eye tracking to evaluate occupant fatigue, sensors to detect use of alcohol by the occupant, sensors to detect a sleep state of the occupant, sensors to detect the height or weight of the occupant, sensors to detect occupant positions, etc.

Another contextual factor may include a state of other vehicles driving alongside autonomous vehicle 10. For example, autonomous control system 24 may evaluate current traffic conditions (e.g., extent of congestion, accidents, etc.), other vehicle behavior (e.g., extensive swerving by other vehicles, other vehicles exceeding the posted speed limit, etc.), destination of other vehicles (though wireless communications), safety of the other vehicles, and the like. In some instances, the other vehicles may communicate with autonomous control system 24 of autonomous vehicle 10 to communicate various ones of the foregoing co-traveling vehicle contextual factors. That is, a vehicle driving on the same road but ahead of autonomous vehicle 10 may report accidents or traffic conditions, weather or other events, vehicle behavior, etc.

Based on one or more of the foregoing contextual factors, processor 12 may determine a current context (which may also be referred to as a "current operational context") in which vehicle 10 is operating autonomously. For example, processor 12 may first determine a state of an occupant available to control vehicle 10. Processor 12 may interface with occupant tracking unit 26 to determine whether the state of the occupant (e.g., assess a level of alertness using gaze tracking, etc.). When the occupant level of alertness equals or exceeds a threshold indicative of being sufficiently alert to control vehicle 10 shortly (within minutes), processor 12 may determine that the current context allows for vehicle 10 to perform a first one of the plurality of default operations—transfer of control (which may be referred to as "hand-off")—to the occupant.

However, when the occupant level of alertness does not exceed the threshold indicative of being sufficiently alert to control vehicle 10, processor 12 may interface with occupant tracking unit 26 to gain further information with regard to the state of the occupant, such as attempting to determine whether the occupant has consumed alcohol, is sleeping, or otherwise incapacitated or unavailable. When the occupant is incapacitated or otherwise unavailable to control vehicle 10, processor 12 may alert other vehicles, contact a configurable list of persons, and potentially alert authorities that vehicle 10 has no capable occupant onboard. If the occupant is not incapacitated, processor 12 may interface with user interface 22, display 20, and/or occupant tracking unit 26 to rouse or otherwise regain the occupant's attention to a sufficient level to control vehicle 10.

Processor 12 may also, either while performing the above listed tasks directed at assessing and regaining occupant alertness, determine an external operating context of vehicle 10. The external operating context of vehicle 10 may include determining any number of external contextual factors, including an operational mode of vehicle 10, a location of vehicle 20, the current weather conditions in which vehicle 10 is traveling, whether there is a safe location nearby to which to navigate, state of traffic, location within traffic, other vehicle behavior, safety of other vehicles, etc. Based on various external factors, processor 12 may interface with autonomous control system 24 to perform a variety of different default operations.

For example, upon determining that the operational mode of vehicle 10 is in transit (or moving), and that there is a safe location at which to stop nearby, processor 12 may interface with autonomous control system 24 to navigate to the safe location and come to a complete stop. Processor 12 may then periodically (or, alternative or in conjunction, upon detecting a change in the state of the occupant) attempt to rouse the occupant (when the occupant is determined to be incapable of operating vehicle 10). As another example, upon determining that the operational mode of vehicle 10 is not in transit (or moving), but that vehicle 10 is blocking traffic, and that there is a safe location at which to stop nearby, processor 12 may interface with autonomous control system 24 to navigate to the safe location and come to a complete stop.

Various other default operations exist when the occupant is unavailable to assume control of vehicle 10. For example, the default operations may include interfacing with other vehicles traveling in the same direction as vehicle 10, where the other vehicle (which may be referred to as a "companion vehicle") may take over control of vehicle 10. One or more companion vehicles may control vehicle 10 to its destination when the occupant is unavailable and autonomous control system 24 is no longer able to autonomously operate vehicle 10 (e.g., due to a sensor failure). Vehicle 10 may, in other words, "dock" with the companion vehicles allowing the companion vehicles to pilot vehicle 10 to its destination or at least until the occupant is able to operate vehicle 10.

In this respect, processor 12 may select or otherwise determine, based on the determined current context, one of a plurality of default operations to perform when vehicle 10 is unable to continue to operate autonomously and unable to transfer control of vehicle 10 to an occupant. Processor 12 may then interface with autonomous control system 24 to perform the determined one of the plurality of operations.

As such, rather than perform one or possibly two default actions, such as defaulting to transitioning control of the vehicle back to an occupant or come to a full stop in the middle of the street when the occupant is unavailable to control the autonomous vehicle, regardless of a surrounding operating context, the techniques may enable the autonomous vehicle to identify the context (e.g., using one or more of the contextual factors discussed above) in which the autonomous vehicle is operating, and perform a progression of default actions suited for the identified context.

Although described as being performed by processor 12, various aspects of the techniques described in this disclosure may be performed by GPU 14 or autonomous control system 24, or any combination of processor 12, GPU 14, and autonomous control system 24. As such, reference to processor 12 above may be understood to refer to one or more processors, which may include processor 12, GPU 14, autonomous control system 24, any combination of processor 12, GPU 14, and autonomous control system 24, or any combination of various processors, some of which may not be shown in the example of FIG. 1.

Figure 2:
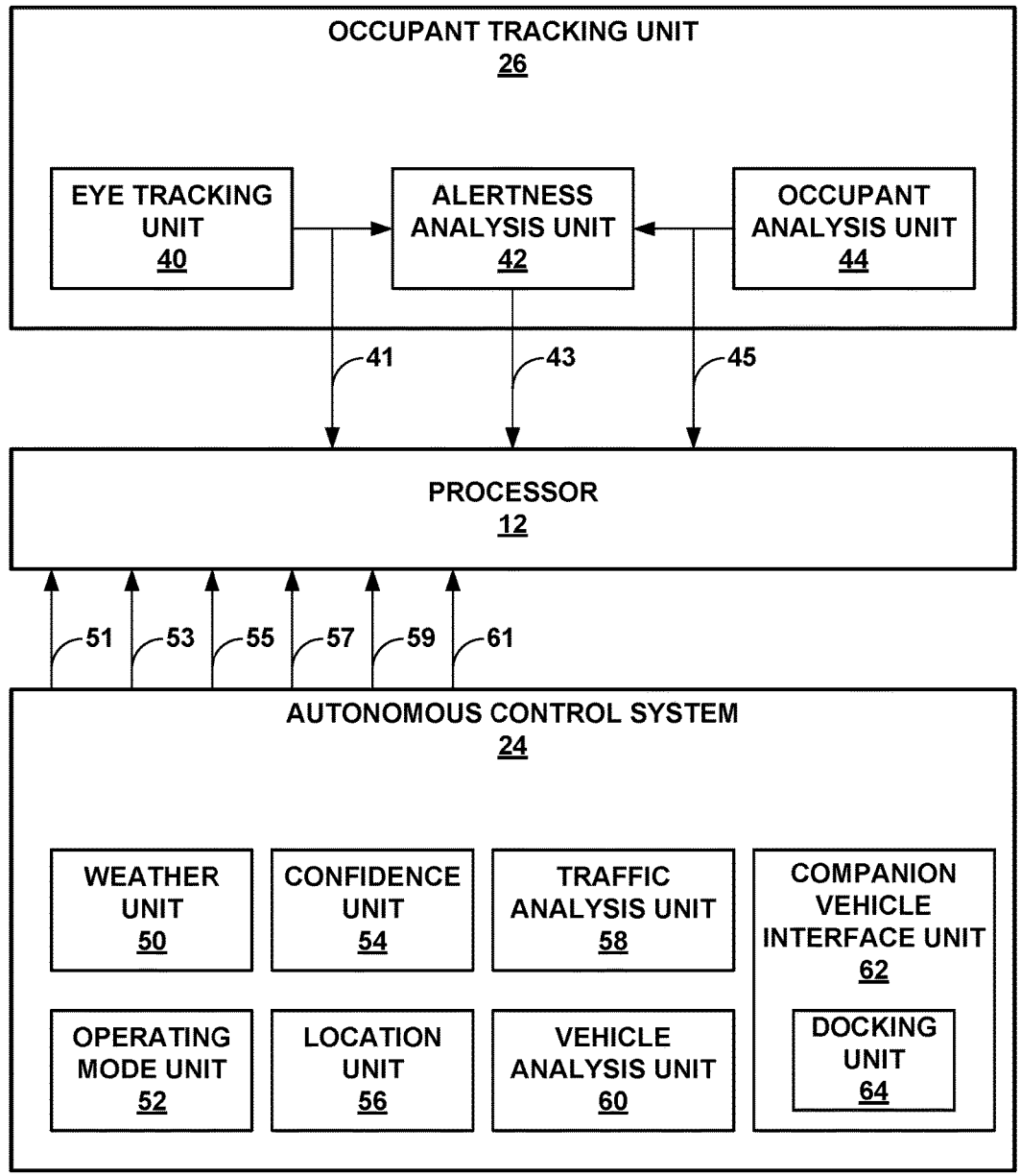
FIG. 2 is a block diagram illustrating various aspects of the autonomous vehicle of FIG. 1 in more detail.

FIG. 2 is a block diagram illustrating various aspects of the autonomous vehicle of FIG. 1 in more detail. In the example of FIG. 2, processor 12, autonomous control system 24, and occupant tracking unit 26 are shown in more detail. Although described with respect to processor 12, autonomous control system 24, and occupant tracking unit 26 performing various aspects of the techniques, the techniques may be performed by any combination of processor 12, autonomous control system 24, and occupant tracking unit 26 or any combination of processors, sensors and/or digital logic hardware capable of performing the various aspects of the techniques described in this disclosure.

As shown in the example of FIG. 2, occupant tracking unit 26 includes eye tracking unit 40, alertness analysis unit 42, and occupant analysis unit 44. Eye tracking unit 40 may represent a unit configured to perform eye tracking or gaze tracking. More information on eye tracking can be found in a paper by Krafka et al., entitled "Eye Tracking for Everyone," dated May 5, 2016, and another paper by Kim et al., entitled "Vision-Based Eye-Gaze Tracking for Human Computer Interface," dated Oct. 12-15, 1999. Eye tracking unit 40 may generate eye status as contextual factors 41 (which may also be referred to as "eye status 41"), which may be output to processor 12 and alertness analysis unit 42.

Alertness analysis unit 42 may represent a unit configured to determine a level of occupant alertness. Alertness analysis unit 42 may, as one example, determine the level of alertness based on eye status 41. More information regarding alertness levels based on eye statuses can be found in a paper by Yong Du, et al., entitled "Driver Fatigue Detection based on Eye State Analysis," presented at the Proceedings of the 11$^{th}$ Joint Conference on Information Sciences, and dated 2008, and in a paper by Kusuma Kumari, entitled "Detection of Drowsy Driver's through Eye State Analysis," published in the International Journal of Science and Research (IJSR), volume 3, issue 9, dated September 2014. Alertness analysis unit 42 may output an alertness level as contextual factor 43 (which may also be referred to as "alertness level 43") to processor 12.

Occupant analysis unit 44 may represent a unit configured to analyze occupant 44 and generate occupant status 45, which may represent yet another contextual factor (and, as such, may be referred to as "contextual factor 45"). Occupant analysis unit 44 may include one or more sensors to determine various states of the occupant, including heart rate (possibly employing heart rate monitors on various vehicle surfaces, such as the seats), breaths per time frame (e.g., minute, which may be detected by sensors present in the seat or other surface), height (e.g., using a camera), weight (e.g., using sensors present in the seat or other surface), blood alcohol content (e.g., through analysis of vehicle cabin air in the vicinity of the occupant), etc.

Occupant analysis unit 44 may further track the position of the occupant, including the position of the head, and possibly the extremities, which may be useful in accessing the alertness level. Occupant analysis unit 44 may analyze the various sensor data to determine one or more states of the occupant, outputting the state as occupant status 45 to alertness analysis unit 42 and processor 12.

Alertness analysis unit 42 may, in addition to the eye status 41 or as an alternative to the eye status 41, determine the alertness level 43 based on occupant status 45. For example, eye tracking unit 40 may, in some instances—such as when the occupant has covered the eyes with sunglasses, an arm, or other article, be unable to identify eye status 41. Alertness analysis unit 42 may determine alertness level 43 based on occupant status 45. In this example, assuming occupant status 45 indicates that the occupant is laying down with face covered, alertness analysis unit 42 may determine a relatively low alertness level.

As further shown in FIG. 2, autonomous control system 24 may include a weather unit 50, an operating mode unit 52, a confidence unit 54, a location unit 56, a traffic analysis unit 58, a vehicle analysis unit 60, and a companion vehicle interface unit 62. Weather unit 50 may represent a unit configured to determine a weather conditions 51 (which may represent another example of a contextual factor and as such may be referred to as "contextual factor 51"). Weather unit 50 may include one or more sensors configured to determine various weather metrics, such as barometric pressure, humidity, temperature, etc. Weather unit 50 may determine weather conditions 51 based on the sensor data. Although described as utilizing sensors, weather unit 50 may further communicate with various outlets (such as the National Weather Service) to determine weather conditions 51. Weather unit 50 may further include visual analysis of image data to confirm determined weather conditions 51 (e.g., to verify rain, snow or other weather conditions). Weather unit 50 may output weather conditions 51 to processor 12.

Operating mode unit 52 may represent a unit configured to determine an operating mode of vehicle 10. Operating mode unit 52 may interface with various autonomous driving systems (LiDar, GPS, etc.) to assess the current operating mode of vehicle 10. Example operating modes may include moving or stopped, a current speed, a direction of travel, etc. Operating mode unit 52 may output operating mode 53 to processor 12 (which may also be referred to as "contextual factor 53").

Confidence unit 54 may represent a unit configured to interface with various sensors that facilitate autonomous operation of vehicle 10 to determine a confidence level associated with each sensor. Confidence unit 54 may interface with, as a couple of examples, the LiDAR system, the GPS system, the autonomous steering system, the autonomous acceleration and breaking system, cameras employed for detecting lane markers and other items of note, and the like. Confidence unit 54 may determine a confidence level based on a current state of the sensors.

Confidence unit 54 may, in some examples, interface with other outlets (including nearby companion vehicles) in an attempt to compare current sensor data with that collected, published or otherwise made available by the other outlets. Divergence between the sensor data collected by the vehicle sensors and the sensor data from other outlets may result in relatively low confidence levels, while convergence of the sensor data collected by the vehicle sensors with the sensor data from other outlets may result in relatively high confidence levels. Confidence unit 54 may output confidence level 55 to processor 12 (where confidence level 55 may represent another contextual factor and, as such, may also be referred to as "contextual factor 55").

Location unit 56 may represent a unit configured to interface with various autonomous driving control systems to determine a location status 57, which may represent yet another contextual factor, and as such may be referred to as "contextual factor 57." Location unit 56 may interface with the LiDAR system, GPS system, cameras and any other sensors to determine a current location of vehicle 10, whether vehicle 10 is blocking traffic, and other location-related statuses. Location unit 56 may output location status 57 to processor 12.

Traffic analysis unit 58 may represent a unit configured to determine traffic status 59 as another contextual factor (which, as a result, may also be referred to as "contextual factor 59"). Traffic analysis unit 58 may interface with various autonomous control systems, such as LiDAR, to determine an extent of traffic. Traffic analysis unit 58 may also interface with various outlets (including various Departments of Transportation, and possible other companion vehicles) to determine traffic status 59, or otherwise verify a locally determined traffic status 59. Traffic analysis unit 58 may also determine traffic status 59 to include a state of congestion, accidents and the like. Traffic analysis unit 58 may output traffic status 59 to processor 12.

Vehicle analysis unit 60 may represent a unit configured to analyze a state of nearby vehicles. Vehicle analysis unit 60 may interface with various autonomous control systems, including LiDAR, cameras, GPS, etc., to assess the state of nearby vehicles. Vehicle analysis unit 60 may determine a safe driving level (which may be referred to as a "vehicle safety level") of each nearby vehicle. More information regarding automated assessment of driving behavior can be found in a paper by Mrinal Haloi, et al., entitled "Characterizing Driving Behavior using Automatic Visual Analysis," dated Oct. 9-11, 2014. Vehicle analysis unit 60 may output a vehicle state 61 to processor 12.

Companion vehicle interface unit 62 may represent a unit configured to interface with companion vehicles. As described above, companion vehicles may refer to vehicles traveling in the same direction (and possibly on the same roads) as vehicle 10, which are capable of communicating via one or more communication protocols with vehicle 10 to exchange information and possibly even remotely control vehicle 10.

Companion vehicle interface unit 62 may communicate with the companion vehicles via any type of communication protocol, including any of the Institute of Electrical and Electronics Engineers (IEEE) 802.11 protocols for forming a wireless local area network, IEEE 802.15.1 Bluetooth™ protocol, protocols for forming mobile ad hoc networks (MANETs), protocols for forming vehicle ad hoc networks (VANETs), and protocols for forming inter-vehicle communication (IVC) links. More information regarding various communication protocols used for inter-vehicle communication can be found in a paper by Theodore L. Willke, et al., entitled "A Survey of Inter-Vehicle Communication Protocols and Their Applications," published in the IEEE Communications Surveys & Tutorials journal, volume 11, number 2, second quarter 2009.

Companion vehicle interface unit 62 may collect information from companion vehicles that augment or, in some instances, replace one or more of contextual factors 51-61. That is, companion vehicle interface unit 62 may collect weather conditions 51 from one or more companion vehicles, receive operation mode 53 of vehicle 10 from one or more companion vehicles, receive sensor data from sensors of one or more companion vehicles to determine confidence level 55, and receive a location status 57 of vehicle 10, traffic status 59 and/or vehicle status 61 from one or more companion vehicles.

Companion vehicle interface unit 62 may also interface with one or more companion vehicles to coordinate travel of vehicle 10 with the companion vehicles, allowing companion vehicles to operate vehicle 10 when hand-off to an occupant of vehicle 10 is not available. When a companion vehicle autonomously operates vehicle 10, vehicle 10 may "dock" with the companion vehicle, where "docking" may refer to transferring control of vehicle 10 to the companion vehicle where vehicle 10 may follow the companion vehicle as if "docked" with the companion vehicle. Companion vehicle interface unit 62 may include a docketing unit 64 that represents a unit configured to select a companion vehicle with which to dock and coordinate the docking of vehicle 10 to the companion vehicle, as described in more detail below with respect to FIG. 4.

Processor 12 may receive contextual factors 41-45 and 51-61 and determine a current context in which the vehicle is operating autonomously based on any combination of the contextual factors 41-45 and 51-61, as described below in more detail with respect to FIGS. 3A and 3B. Processor 12 may next determine one or more of a plurality of different default operations to perform when the vehicle is unable to continue to operate autonomously, and unable to transfer control of the vehicle to the occupant. Processor 12 may interface with autonomous control system 24 to perform the determined one of the plurality of operations, as outlined in more detail with respect to FIGS. 3A and 3B.

Figure 3A:
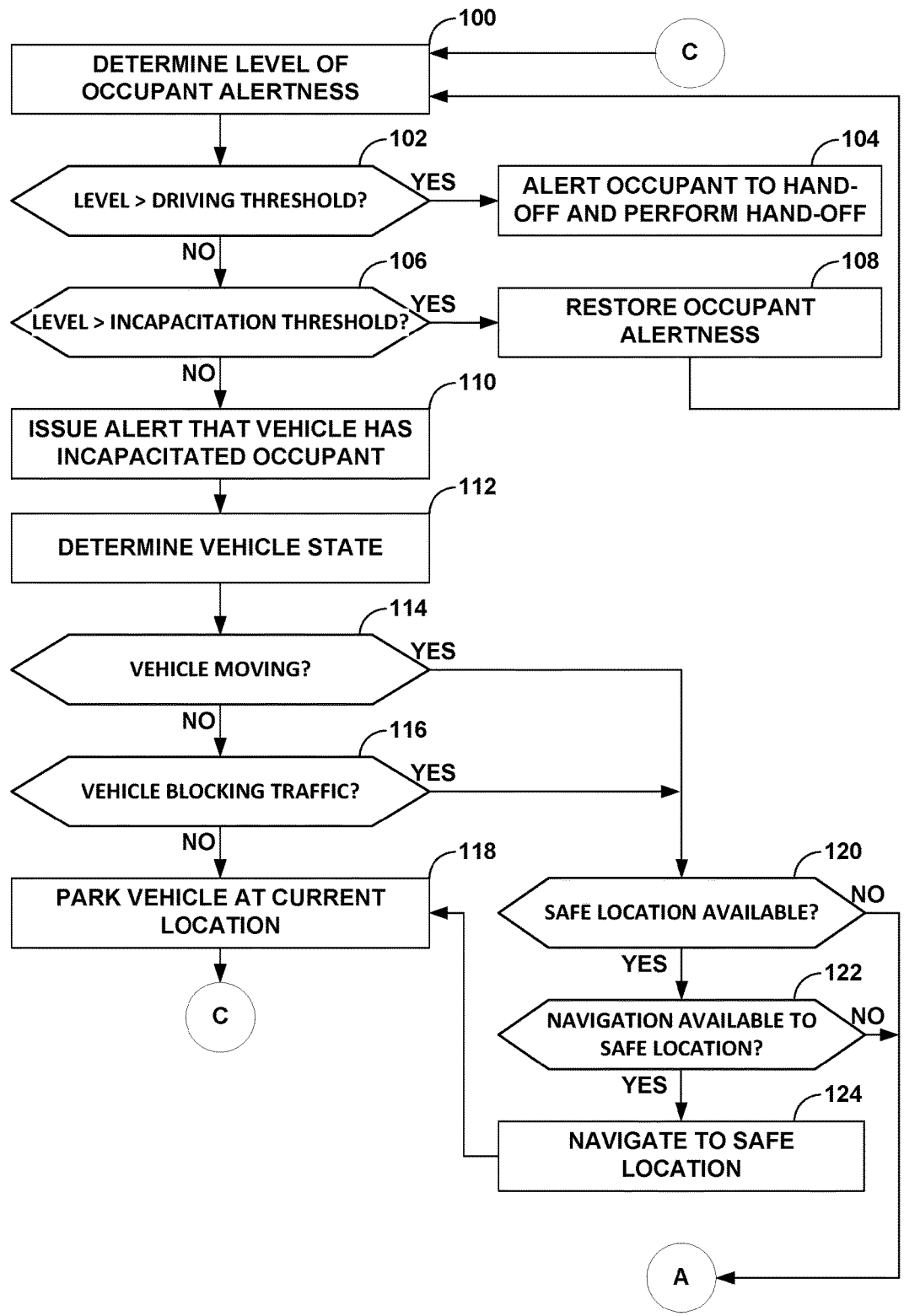
FIGS. 3A and 3B are flowcharts illustrating example operation of the vehicle shown in FIG. 2 in performing various aspects of the autonomous driving techniques described in this disclosure.
Figure 3B:
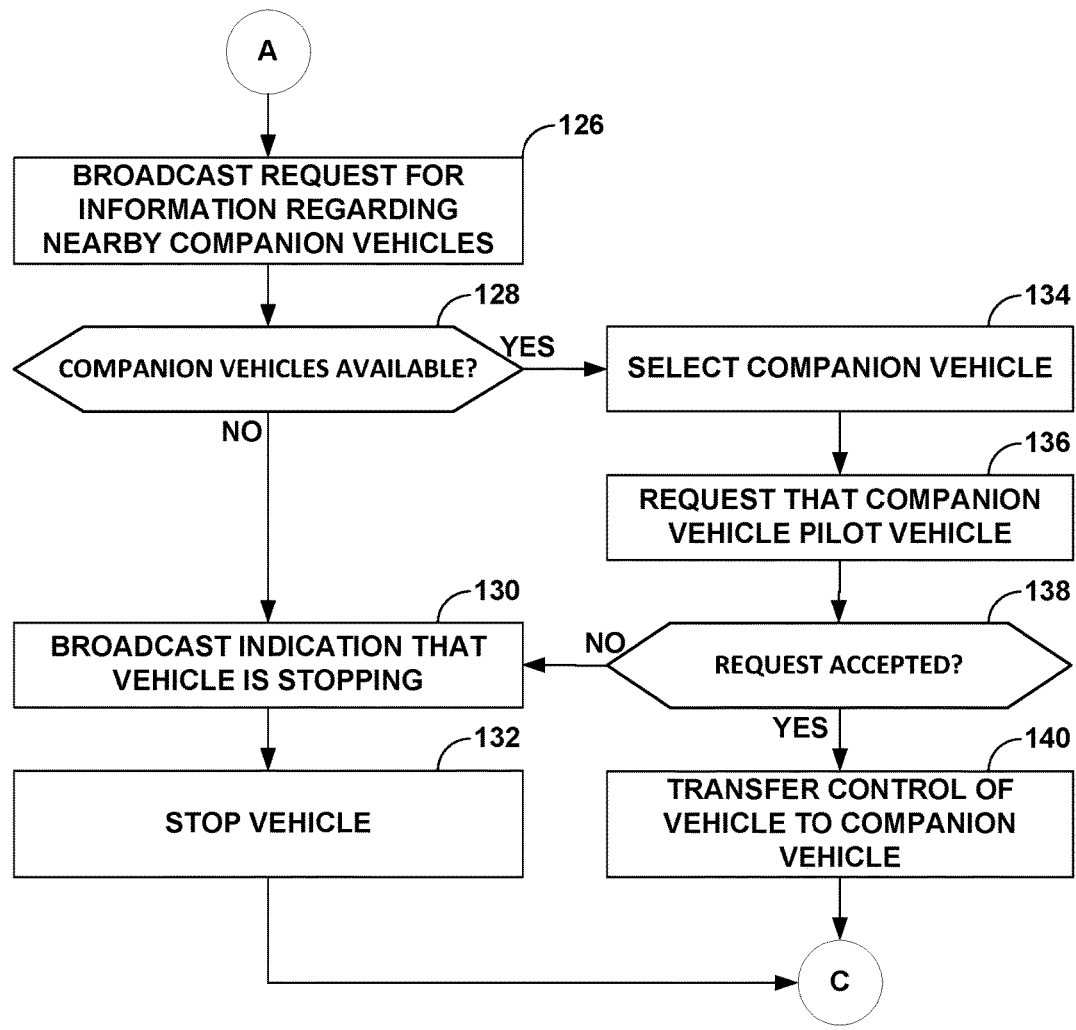

FIGS. 3A and 3B are flowcharts illustrating example operation of vehicle 10 in performing various aspects of the autonomous driving techniques described in this disclosure. Referring first to the example of FIG. 3A, alertness analysis unit 42 of occupant tracking unit 26 included within vehicle 10 may determine a level of alertness (which is shown in FIG. 2 as alertness level 43) in the manner described above (100). Alertness analysis unit 42 may output alertness level 43 to processor 12.

Processor 12 may compare level 43 to a driving alertness threshold (which is shown as "driving threshold" for ease of illustration, 102). When level 43 is greater than (or, in some instances, equal or greater than) the driving alertness threshold ("YES" 102), processor 12 may interface with user interface 22 and/or display 20 to alert the occupant to hand-off, while also interfacing with autonomous control system 24 to perform the hand-off to the occupant (104).

When level 43 is less than (or, in some instances, less than or equal to) the driving alertness threshold ("NO" 102), processor 12 may compare level 43 to an incapacitation threshold (106). In some examples, the incapacitation threshold is less than the driving alertness threshold. When level 43 is greater than (or, in some instances, greater than or equal to) the incapacitation threshold ("YES" 106), processor 12 may interface with user interface 22 and/or display 20 to issue alarms, present visual stimuli, and/or perform other attention raising operations to restore occupant alertness (108). After attempting to restore occupant alertness, occupant tracking unit 24 and processor 12 may again determine level 43 and compare the level 43 to one or both of the thresholds until the occupant is available to participate in the hand-off (100-108).

When level 43 is less than (or, in some instances, less than or equal to) the incapacitation threshold ("NO" 106), processor 12 may interface with user interface 22, display 22, and/or autonomous control system 24 to issue an alert that vehicle 10 has an incapacitated occupant (110). Processor 12 may, for example, interface with autonomous control system 24 to interface with a companion vehicle via companion vehicle interface unit 62 to alert potential companion vehicles that vehicle 10 has an incapacitated driver. Processor 12 may also interface with a communication unit (not shown in FIGS. 1 and 2) to initiate a telephone call to authorities to alert the authorities of the incapacitated occupant, or to a defined list of contacts to alert the contacts of the incapacitated occupant.

While performing the foregoing occupant specific contextual assessment or after performing the foregoing occupant specific contextual assessment, processor 12 may determine a state of vehicle 10 (112). That is, processor 12 may interface with autonomous control system 24 to collect contextual factors 51-61. When operational mode 53 indicates that vehicle 10 is not moving ("NO" 114) and location status 57 indicates that vehicle 10 is not blocking traffic ("NO" 116), processor 12 may interface with autonomous control system 24 to park vehicle 10 at the current location (118). Processor 12 may continue to perform the above described occupant specific contextual assessment periodically and/or until alertness level 43 of occupant is sufficient high to permit manual operation of vehicle 10 (100-108).

When operating mode 53 indicates that vehicle 10 is moving ("YES" 114) or when operating mode 53 indicates that vehicle 10 is not moving ("NO" 114) but location status 57 indicates that vehicle 10 is blocking traffic ("YES" 116), processor 12 may next determine whether a safe location is available at which vehicle 10 can park (120). Processor 12 may determine a safe location by interfacing with autonomous control system 24, which may determine whether a safe location exists based on a digital mapping software and current location (via, e.g., GPS), communication with companion vehicles, local LiDAR readings, and/or analysis of video imagery captured by cameras of vehicle 10 and/or companion vehicles. Safe locations may refer to any location that allows vehicle 10 to come to a full stop without blocking traffic and while adhering to relevant traffic laws.

Upon detecting that a safe location is available ("YES" 120), processor 12 may continue to interface with autonomous control system 24 to determine whether navigation to the safe location is possible (122). Navigation to the safe location may, as an example, not be possible when confidence level 55 regarding a system sensor pertinent to navigation has fallen drastically (indicating failure of the sensor) or other operation of the car is compromised (e.g., a tire pressure monitoring sensor indicates a severe flat tire that may prevent driving at distance).

When navigation is available to the safe location ("YES" 122), processor 12 may interface with autonomous control system 24 to navigate to the safe location and, after navigating to the safe location, park vehicle 10 at the current location (124, 118). Again, processor 12 may continue to perform the above described occupant specific contextual assessment periodically and/or until alertness level 43 of occupant is sufficient high to permit manual operation of vehicle 10 (100-108).

When a safe location is not available ("NO" 120) or when a safe location is available but navigation to the safe location is not possible ("YES" 120, "NO" 122), processor 12 may interface with autonomous control system 24 to broadcast a request for information regarding nearby companion vehicles (FIG. 3B, 126). That is, companion vehicle interface unit 62 may generate a request for companion vehicle information in accordance with an IVC protocol, and transmit the request for companion information in accordance with the IVC protocol.

Companion vehicles in the vicinity of vehicle 10 (e.g., within tens of miles or less) may respond to the request specifying a destination to which each companion vehicle is traveling, and a safety profile (which may also be referred to as a "safety rating") to which the companion vehicle adheres when autonomously operating. The safety profile may specify an extent that the companion vehicle may travel at indicated speed limits, whether the vehicle is able to make lane changes, the frequency of lane changes, whether autonomous operation is permitted on non-highway roads, a level of equipment used for autonomous operations, and the like.

When no companion vehicles are available ("NO" 128) as evidenced by receiving no responses from companion vehicles to the broadcasted request, processor 12 may interface with autonomous control system 24 to broadcast an indication that vehicle 10 is stopping via the IVC protocol, and to stop vehicle 10 (130, 132). When companion vehicles are available ("YES" 128) as evidenced by receiving a response from each of one or more companion vehicles to the broadcasted request, processor 12 may select one of the companion vehicles (134) as described in more detail with respect to the example of FIG. 4.

After selecting one of the companion vehicles, processor 12 may next interface with autonomous control system 24 to request that the selected companion vehicle pilot vehicle 10 (136). When the request is not accepted ("NO" 138), processor 12 may interface with autonomous control system 24 to broadcast an indication that vehicle 10 is stopping via the IVC protocol, and to stop vehicle 10 (130, 132).

Processor 12 may continue to perform the above described occupant specific contextual assessment periodically and/or until alertness level 43 of occupant is sufficient high to permit manual operation of vehicle 10 (100-108). Processor 12 may also continue to assess the state of the vehicle, determine whether the current location is suitable for stopping and parking, determine whether a safe location is available and that navigation is available to the safe location, even when stopped (112-124).

When the request is accepted ("YES" 138), processor 12 may interface with autonomous control system 24 to transfer control of vehicle 10 to companion vehicle (140). In this respect, rather than attempt to stop or pull off the road when vehicle 10 is in a moving traffic environment and is itself moving, vehicle 10 may perform a safer action by simply continuing to follow a car in front of the vehicle.

Processor 12 may continue to perform the above described occupant specific contextual assessment periodically and/or until alertness level 43 of occupant is sufficient high to permit manual operation of vehicle 10 (100-108). Processor 12 may also continue to assess the state of the vehicle, determine whether the current location is suitable for stopping and parking, determine whether a safe location is available and that navigation is available to the safe location, even when docked (or, in other words, following a companion car) (112-124)

Figure 4:
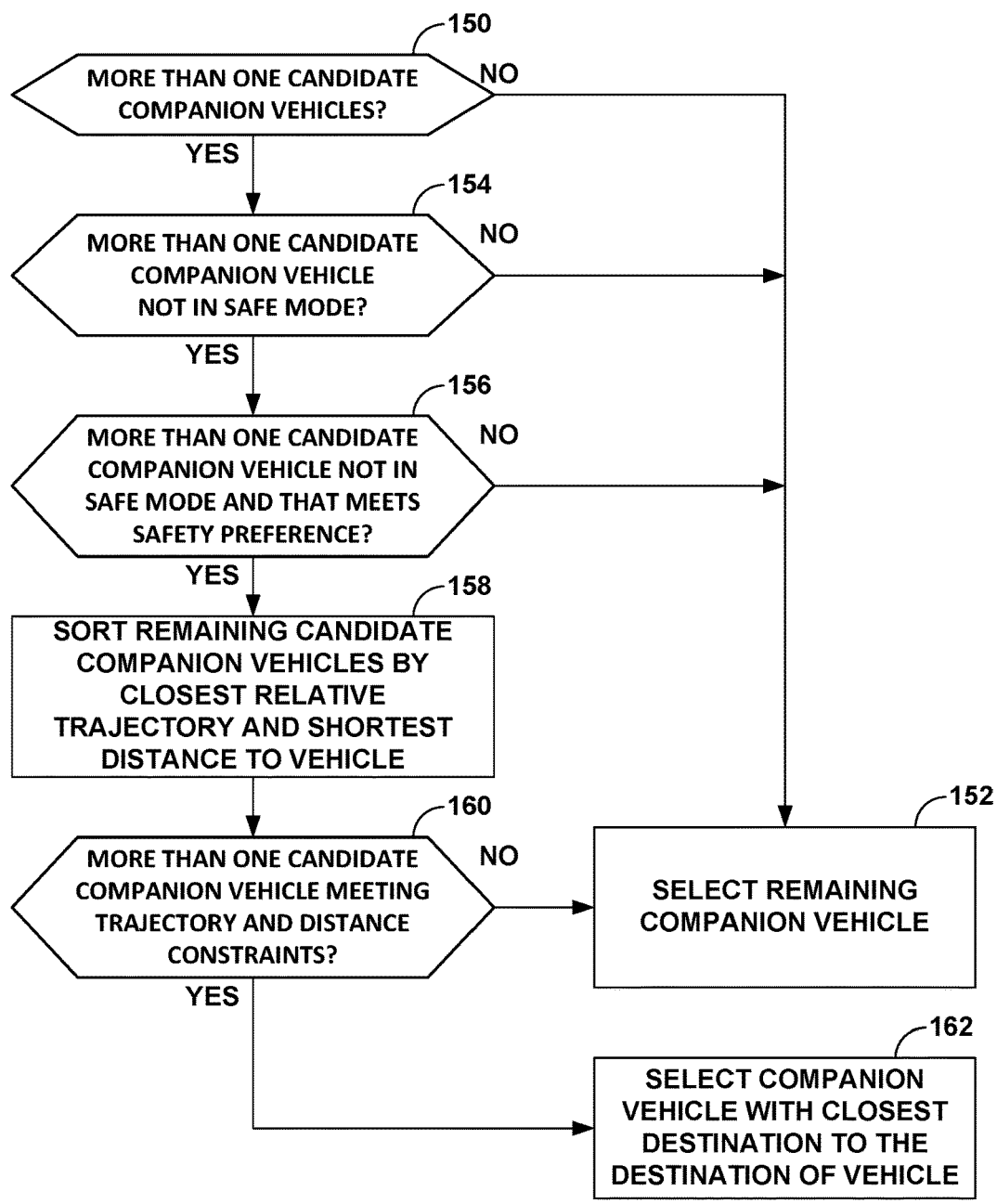
FIG. 4 is a flowchart illustrating example operation of the vehicle shown in FIG. 2 in selecting a companion vehicle in accordance with various aspects of the autonomous driving techniques described in this disclosure.

FIG. 4 is a flowchart illustrating example operation of vehicle 10 in selecting a companion vehicle in accordance with various aspects of the autonomous driving techniques described in this disclosure. In the example of FIG. 4, processor 12 of vehicle 10 may first determine whether there is more than one candidate companion vehicle that responded to the request for companion vehicle information (150). When only a single candidate companion vehicle responded to the request for companion vehicle information ("NO" 150), processor 12 may select the single remaining candidate companion vehicle (152).

When more than one candidate companion vehicle responded to the request for companion vehicle information ("YES" 150), processor 12 may determine whether there is more than one candidate companion vehicle not in a safe mode (154). Safe mode refers to a mode in which the companion vehicle enters when operating with an incapacitated occupant. Processor 12 may determine whether each of the companion vehicles is in the safe mode from the information (such as the safety profile) specified in the response by each companion vehicle to the request. When a single remaining candidate companion vehicle is not in safe mode ("NO" 154), processor 12 may select the single remaining candidate companion vehicle (152).

When more than one candidate companion vehicle is not in the safe mode ("YES" 154), processor 12 may determine whether the one or more candidate companion vehicles not in the safe mode meet a safety preference (156). The occupant or manufacturer or other operator of vehicle 10 may specify the safety preference. The safety preference may be set in the same context as the safety profile, meaning that the safety preference may use the same scale for evaluating the safety of the companion vehicle as that used by the safety profile set for vehicle 10. In some examples, the safety preference may be the same as the safety profile set for vehicle 10.

When a single candidate companion vehicle is not in the safe mode and meets the safety preference ("NO" 156), processor 12 may select the single remaining candidate companion vehicle (152). When more than one candidate companion vehicle are not in the safe mode and meet the safety preference, processor 12 may sort the remaining candidate companion vehicles by closes relative trajectory and shortest distance to vehicle 10.

That is, processor 12 may compare the destinations specified in response to the request by each companion vehicle to the destination of vehicle 10 and/or the each route the companion vehicles are taking to the respective destination to the route to the destination of vehicle 10 to determine the relative trajectory. Processor 12 may interface with autonomous control system 24 to determine the destinations and routes of the companion vehicles, where autonomous control system 24 may communicate with each companion vehicle via the IVC protocol to determine the routes and/or determine the routes using digital mapping software. Autonomous control system 24 may also determine the current location of each companion vehicle so as to determine which of the companion vehicles have the shortest distance to vehicle 10.

Processor 12 may sort the companion vehicles by relative trajectory and shortest distance (to vehicle 10) in any number of different ways. Processor 12 may assign relative trajectory a value (with a lower value indicating relatively high trajectory overlap and a higher value indicating a relatively low trajectory overlap) and combine the relative trajectory value with the shortest distance. Processor 12 may then sort the companion vehicles by the resulting combined relative trajectory/shortest distance value. As another example, processor 12 may compute an average (including a weighted average in some instances) of the relative trajectory value and the shortest distance.

Processor 12 may next determine whether more than one candidate companion vehicle meeting the trajectory and distance constraints (160). Processor 12 may apply a threshold to the sorted list to eliminate companion vehicles having a combined trajectory/shortest distance value that is equal to or greater than (or, in some instances, only greater than) the threshold. When there is a single candidate companion vehicle meeting the trajectory and distance constraints ("NO" 160), processor 12 may select the single remaining candidate companion vehicle (152). When there is more than one candidate companion vehicle meeting the trajectory and distance constraints ("YES" 160), processor 12 may select the companion vehicle with the closest destination to the destination of vehicle 10 (162).

In this way, the techniques described in this disclosure may attempt to address issues with statically defined default operations that do not consider the current operating context. The techniques of this disclosure may select one or more default operations that define a so-called "safe mode" based upon the current operating context, which may include the current conditions, a confidence level of the current conditions, a state of the occupant, and the state of other vehicles.

As noted above, safe modes may be defined as modes of operation where the safety of the occupants of vehicle 10 and all surrounding entities is prioritized over any other goal. Three safe modes may be stopping vehicle 10, pulling vehicle 10 over to a safe location and stopping, and transferring control to a companion vehicle (which may be referred to as "platooning" with a companion vehicle).

Figure 5:
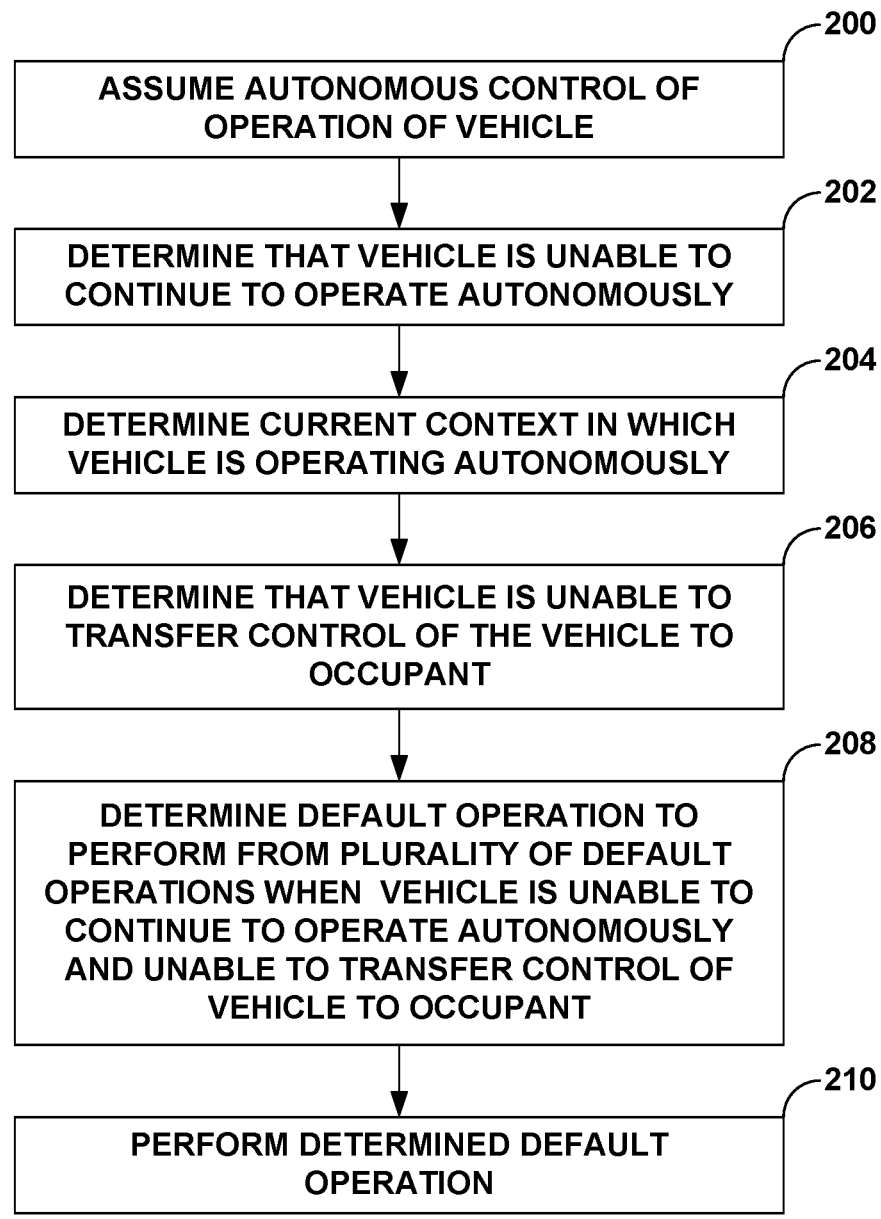
FIG. 5 is a flowchart illustrating example operation of the vehicle shown in FIG. 1 in performing various aspects of the autonomous driving techniques described in this disclosure.

FIG. 5 is a flowchart illustrating example operation of vehicle 10 in performing various aspects of the autonomous driving techniques described in this disclosure. In the example of FIG. 5, vehicle 10 may invoke autonomous control system 24 to assume autonomous control of operation of vehicle 10 (200). At some later time, autonomous control system 24 may determine that vehicle 10 is unable to continue to operate autonomously (202). As such, autonomous control system 24 may determine that hand-off to an occupant of vehicle 10 is required.

Processor 12 of vehicle 10 may then perform various aspects of the techniques described above to determine a current context in which vehicle 10 is operating autonomously, while also determining that vehicle 10 is unable transfer control of vehicle 10 to the occupant (204, 206). Processor 12 may next determine a default operation to perform from a plurality of default operations when vehicle 10 is unable to continue to operate autonomously and unable to transfer control of vehicle 10 to the occupant (208). Processor 12 may interface with autonomous control system 24 to perform the determined default operation (210).

In this way, the techniques may address existing problems with selecting default operations by selecting one or more default operations that define a so-called "safe mode" based upon the current conditions, the vehicle's certainty about the current conditions, the occupant's state, and the state of other vehicles. The techniques may cover the decision making process after determining that a default operation (or, in other words, safe mode) is required.

When a vehicle is in a moving traffic environment and the vehicle is itself moving, the safest action may be to continue following a car in front of the vehicle rather than attempting to stop or pull off the road. To allow this, vehicles may communicate with each other and execute a virtual or physical docking procedure. When vehicle 10 determines that initiation of safe mode behavior is required, and that docking is the appropriate action, vehicle 10 may broadcast a request to dock or platoon with other nearby companion vehicles. When the request is accepted by nearby vehicles, vehicle 10 may select among the available vehicles, selecting one to dock to and platoon with.

To select one of the companion vehicles, vehicle 10 may perform an algorithm that evaluates candidate companion vehicles based on their current location and trajectory, their eventual destination, their current mode (e.g. may not choose another vehicle also in safe mode), and statistics about that vehicle's safety. Once the best vehicle is chosen, vehicle 10 may send a request to dock with that specific companion vehicle. When the other companion vehicle accepts, vehicle 10 may initiate the docking procedure.

Once docked and platooning with the other companion vehicle, vehicle 10 may put itself into a safe mode and should begin or continue to rouse and alert the occupant in vehicle 10 to the need to hand-off. When a viable occupant becomes available in vehicle 10, then control can be handed off to the occupant and the occupant can initiate the undocking from the leader vehicle when ready. When a viable driver does not become available, vehicle 10 can alert other vehicles, emergency personnel or friends and family of any occupant inside vehicle 10 that no capable driver is available in the vehicle. Vehicle 10 can also continue to evaluate possible stopping locations while docked and if one becomes available, or vehicle 10 determines that safe-mode can be left, vehicle 10 may undock from the companion vehicle and resume control.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media. In this manner, computer-readable media generally may correspond to tangible computer-readable storage media which is non-transitory. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. It should be understood that computer-readable storage media and data storage media do not include carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of autonomous operation of a vehicle, the method comprising:
   determining, by the vehicle currently operating autonomously, a current context in which the vehicle is operating autonomously;
   determining, by the vehicle currently operating autonomously and based on the current context, one of a plurality of operations to perform when the vehicle is unable to continue to operate autonomously and unable to transfer control of the vehicle to an occupant, wherein the determined one of the plurality of operations includes selecting, from a plurality of companion vehicles, and based at least in part on a safety profile associated with each of the plurality of companion vehicles, a companion vehicle traveling along with the vehicle that is available to take control of the vehicle and transferring control to the companion vehicle; and
   performing, by the vehicle, the determined one of the plurality of operations to select the companion vehicle and transfer control to the companion vehicle.

2. The method of claim 1, wherein determining the current context comprises determining the current context based on one or more of a state of the vehicle, a state of other vehicles traveling with the vehicle, and a state of an occupant of the vehicle.

3. The method of claim 1,
   wherein determining the current context comprises determining a state of an occupant of the vehicle, and
   wherein the method further comprises determining that the vehicle is unable to transfer the control of the vehicle to the occupant based on the determined state of the occupant.

4. The method of claim 3,
   wherein determining the state of the occupant comprises determining an alertness level of the occupant, and
   wherein determining that the vehicle is unable to transfer the control of the vehicle to the occupant comprises determining that the vehicle is unable to transfer the control of the vehicle to the occupant when the alertness level is below a threshold.

5. The method of claim 1, wherein selecting the companion vehicle comprises selecting the companion vehicle from the plurality of companion vehicles that also has a destination that is closest to a destination of the vehicle.

6. The method of claim 1, further comprising:
   determining a state of the vehicle;
   determining, when the state of the vehicle indicates the vehicle is not in motion and not blocking traffic, to stop in the road on which the vehicle is currently operating autonomously.

7. The method of claim 1, further comprising:
   determining a state of the vehicle;
   determining, when a state of the vehicle indicates the vehicle is in motion and cannot stop at the current location, or is not in motion but blocking traffic, to identify a safe location at which to come to a stop, and drive to and stop at the safe location.

8. The vehicle of claim 1, further comprising:
   means for determining a state of the vehicle; and
   means for determining, when a state of the vehicle indicates the vehicle is in motion and cannot stop at the current location, or is not in motion but blocking traffic, to identify the safe location at which to come to a stop, and drive to and stop at the safe location.

9. A vehicle configured to operate autonomously, the vehicle comprising:
a processor configured to determine, while currently operating autonomously, a current context in which the vehicle is operating autonomously; and
a memory configured to store the current context,
wherein the processor is further configured to:
determine, while currently operating autonomously and based on the current context, one of a plurality of operations to perform when the vehicle is unable to continue to operate autonomously, and unable to transfer control of the vehicle to an occupant, wherein the determined one of the plurality of operations includes selecting, from a plurality of companion vehicles, and based at least in part on a safety profile associated with each of the plurality of companion vehicles, a companion vehicle traveling along with the vehicle that is available to take control of the vehicle and transferring control to the companion vehicle; and
perform the determined one of the plurality of operations to select the companion vehicle and transfer control to the companion vehicle.

10. The vehicle of claim 9, wherein the processor is configured to determine the current context based on one or more of a state of the vehicle, a state of other vehicles traveling with the vehicle, and a state of an occupant of the vehicle.

11. The vehicle of claim 9,
wherein the processor is configured to determine a state of an occupant of the vehicle, and
wherein the processor is further configured to determine that the vehicle is unable to transfer the control of the vehicle to the occupant based on the determined state of the occupant.

12. The vehicle of claim 11,
wherein the processor is configured to determine an alertness level of the occupant, and
wherein the processor is configured to determine that the vehicle is unable to transfer the control of the vehicle to the occupant when the alertness level is below a threshold.

13. The vehicle of claim 9, wherein the processor is configured to select the companion vehicle from the plurality of companion vehicles that also has a destination that is closest to a destination of the vehicle.

14. The vehicle of claim 9, wherein the processor is further configured to:
determine a state of the vehicle; and
determine, when the state of the vehicle indicates the vehicle is not in motion and not blocking traffic, to stop in the road on which the vehicle is currently operating autonomously.

15. The vehicle of claim 9, wherein the processor is further configured to:
determine a state of the vehicle; and
determine, when a state of the vehicle indicates the vehicle is in motion and cannot stop at the current location, or is not in motion but blocking traffic, to identify the safe location at which to come to a stop, and drive to and stop at the safe location.

16. A vehicle configured to operate autonomously, the vehicle comprising:
means for determining, while the vehicle is currently operating autonomously, a current context in which the vehicle is operating autonomously;
means for determining, while the vehicle is currently operating autonomously and based on the current context, one of a plurality of operations to perform when the vehicle is unable to continue to operate autonomously, and unable to transfer control of the vehicle to an occupant, wherein the determined one of the plurality of operations includes selecting, from a plurality of companion vehicles, and based at least in part on a safety profile associated with each of the plurality of companion vehicles, a companion vehicle traveling along with the vehicle that is available to take control of the vehicle and transferring control to the companion vehicle; and
means for performing the determined one of the plurality of operations to select the companion vehicle and transfer control to the companion vehicle.

17. The vehicle of claim 16, wherein the means for determining the current context comprises means for determining the current context based on one or more of a state of the vehicle, a state of other vehicles traveling with the vehicle, and a state of an occupant of the vehicle.

18. The vehicle of claim 16,
wherein the means for determining the current context comprises means for determining a state of an occupant of the vehicle, and
wherein the vehicle further comprises means for determining that the vehicle is unable to transfer the control of the vehicle to the occupant based on the determined state of the occupant.

19. The vehicle of claim 18,
wherein the means for determining the state of the occupant comprises means for determining an alertness level of the occupant,
wherein the means for determining that the vehicle is unable to transfer the control of the vehicle to the occupant comprises means for determining that the vehicle is unable to transfer the control of the vehicle to the occupant when the alertness level is below a threshold.

20. The vehicle of claim 16, wherein the means for selecting the companion vehicle comprises means for selecting the companion vehicle from the plurality of companion vehicles that also has a destination that is closest to a destination of the vehicle.

21. The vehicle of claim 16, further comprising:
means for determining a state of the vehicle; and
means for determining, when the state of the vehicle indicates the vehicle is not in motion and not blocking traffic, to stop in the road on which the vehicle is currently operating autonomously.

22. A non-transitory computer-readable storage medium having stored thereon instructions that, when executed, cause one or more processors of a vehicle to:
determine, while the vehicle is currently operating autonomously, a current context in which the vehicle is operating autonomously;
determine, while the vehicle is currently operating autonomously and based on the current context, one of a plurality of operations to perform when the vehicle is unable to continue to operate autonomously, and unable to transfer control of the vehicle to an occupant, wherein the determined one of the plurality of operations includes selecting, from a plurality of companion vehicles, and based at least in part on a safety profile associated with each of the plurality of companion vehicles, a companion vehicle traveling along with the vehicle that is available to take control of the vehicle and transferring control to the companion vehicle; and perform the determined one of the plurality of operations to select the companion vehicle and transfer control to the companion vehicle.

23. The non-transitory computer-readable storage medium of claim 1, wherein the instructions, when executed, cause the one or more processors to determine the current context based on one or more of a state of the vehicle, a state of other vehicles traveling with the vehicle, and a state of an occupant of the vehicle.

24. The non-transitory computer-readable storage medium of claim 22, wherein the instructions, when executed, cause the one or more processors to:
   determine an alertness level of the occupant, and
   determine that the vehicle is unable to transfer the control of the vehicle to the occupant when the alertness level is below a threshold.

* * * * *